No. 670,221. Patented Mar. 19, 1901.
R. H. CABELL.
DRINK DISPENSING URN.
(Application filed Dec. 14, 1900.)
(No Model.)
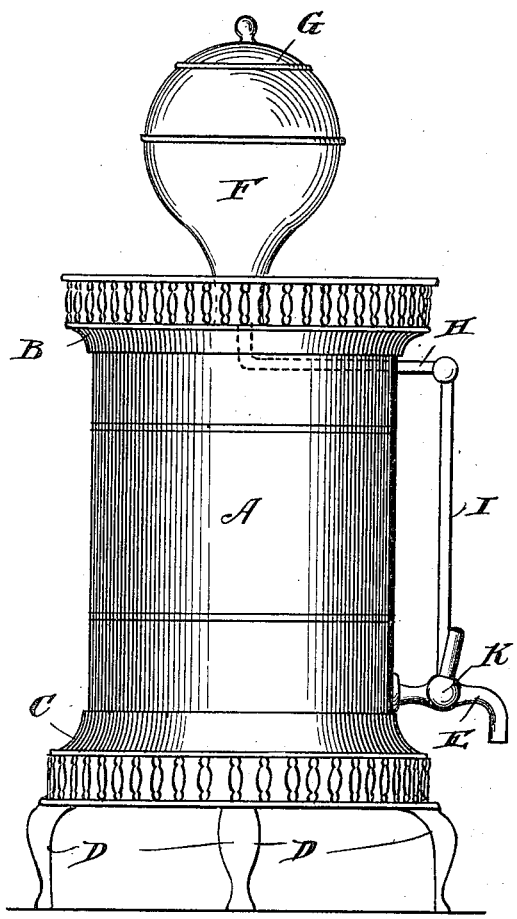
Witnesses,
Inventor,
Robert H. Cabell,
By Offield, Towle & Linthicum
Attys.

United States Patent Office.

ROBERT H. CABELL, OF CHICAGO, ILLINOIS, ASSIGNOR TO ARMOUR & COMPANY, OF ILLINOIS.

DRINK-DISPENSING URN.

SPECIFICATION forming part of Letters Patent No. 670,221, dated March 19, 1901.

Application filed December 14, 1900. Serial No. 39,831. (No model.)

*To all whom it may concern:*

Be it known that I, ROBERT H. CABELL, of Chicago, county of Cook, and State of Illinois, have invented certain new and useful Improvements in Drink-Dispensing Urns, of which the following is a specification.

My invention relates to urns or fountains for dispensing drinks, and relates more particularly to that class of urns containing a suitable water-reservoir and in connection therewith an additional reservoir designed to contain a fluid extract—such, for instance, as an extract of beef—in a highly-concentrated form from which the water and the extract are drawn off and mixed in suitable or desired proportions. Heretofore in devices of this character, so far as I am aware, it has been customary to locate the receptacle containing the fluid extract within the larger tank or receptacle containing the water and to draw off the contents of each through separate discharge-pipes separately controlled or through a single faucet having a suitable two-way cock connected with the separate discharge-pipes. Where hot drinks are served from devices of this sort, as is most frequently the case, the above-described relative arrangement of water-tank and extract-receptacle, the latter within and inclosed by the former, has been found to present a serious objection, for the reason that thereby the extract necessarily partakes of the heat of the surrounding or adjacent body of water and as a result thereof will not keep as long or remain as well preserved as where it is not subjected to a heat above the ordinary temperature of the atmosphere in the room where the urn is located.

The object of my invention, therefore, has been to so locate the extract holder or receptacle relatively to the hot-water tank as that it shall be least subjected to the latter and yet occupy a convenient and accessible position, its discharge-pipe being connected to the discharge pipe or faucet of the hot-water tank through a suitable two-way cock, so that water and extract may be separately drawn off in any suitable or desired proportions.

My invention in its preferred form is illustrated in the accompanying drawing, which is a side elevation showing the relative location of the water and extract reservoirs and the preferred manner of connecting their discharge-pipes to a common nozzle or faucet.

In the drawing, A represents a water tank or reservoir, preferably of plain cylindric form, having suitable outwardly-flanged top and bottom plates B and C, respectively, and supported upon suitable legs D.

E is a short discharge pipe or faucet tapping the tank A near its lower end, as shown.

The water contained in the tank A may be heated by means of an alcohol-flame or any other suitable heating device conveniently located therebeneath.

At F is shown a reservoir or receptacle for containing the condensed extract or other fluid designed to be served from the urn. This receptacle, which in the form shown is substantially of inverted-pear shape, is located exterior to the water-tank and preferably directly above and in central alinement therewith. The said receptacle F may be provided with a suitable lid or closure G at its upper end, while its lower contracted neck is screwed into or otherwise secured to the cover or top plate B of the water-tank. Into the lower end of this contracted neck of the extract-receptacle F is screwed or otherwise secured the upper end of a discharge-pipe H, which below the cover B is extended horizontally and radially through the tank A, and at its outer end connects with the upper end of a vertical pipe I, located outside of the water-tank and at its lower end leading into the discharge pipe or faucet E. At the intersection of said last-named pipes is placed an ordinary two-way cock K, by turning which water and extract may be drawn off separately in the quantities and proportions desired from the tank A and receptacle F.

By locating the extract-receptacle F above the hot-water tank A, as shown, and connecting it with the faucet E by the pipes H and I the extract is placed outside the heating influence of the hot water and at the same time it is advantageously located to facilitate the flow of the extract by gravity to the discharge-faucet E. By passing that part of the extract-discharge pipe marked H through the upper end of the hot-water tank the extract on its way to the discharge-cock is heated sufficiently to promote its ready flow, as is sometimes found desirable where the extract has become somewhat thickened and viscous, without at the same time heating the main body of extract in the receptacle F, and thereby injuring or impairing its keeping qualities.

The several parts of my improved urn may be nickled or otherwise polished and ornamented, as desired, and when assembled in the forms and relation shown present an urn that is at once useful, convenient, and pleasing to the eye.

I claim—

1. In an urn of the character specified, the combination with the water-tank provided with a suitable discharge pipe or nozzle, of an extract-receptacle having a contracted neck, located directly above said water-tank and having its contracted neck portion screwed or otherwise secured into the top or cover of the water-tank, a discharge-pipe leading from the contracted neck of the extract-receptacle to the discharge-pipe of the water-tank, said extract-discharge pipe being partly within and partly without said water-tank, and a two-way cock located at the union of the discharge-pipes, substantially as described.

2. In an urn of the character specified, the combination with the hot-water tank provided with a suitable discharge pipe or nozzle, of an extract-receptacle having a contracted neck supported centrally above and upon said tank and secured by its contracted neck on or into the top or cover of the hot-water tank, a discharge-pipe connected with the neck of said receptacle and extending horizontally through the top portion of the tank to the outside thereof, and continuing vertically therefrom to the discharge-pipe of the water-tank, and a two-way cock located at the union of said discharge-pipes, substantially as described.

ROBERT H. CABELL.

Witnesses:
SAMUEL N. POND,
ADA H. BARNES.